(No Model.)
W. RAYDT.
APPARATUS FOR FORCING BEER.
No. 357,031. Patented Feb. 1, 1887.
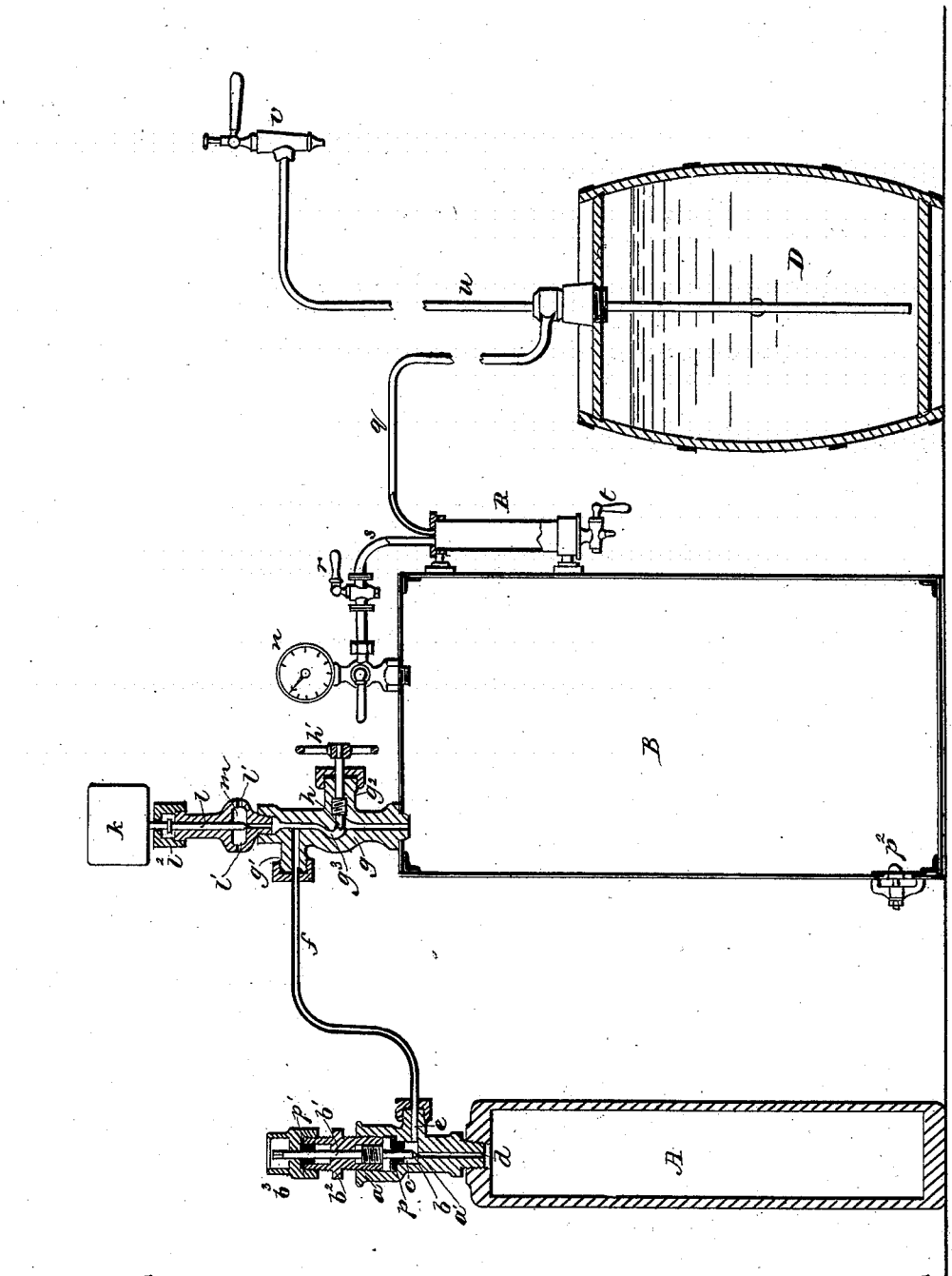
Attest
O. B. Coulter
P. M. Knobloch.
Inventor
Wilhelm Raydt,
per Henry [—]
his atty

UNITED STATES PATENT OFFICE.

WILHELM RAYDT, OF HANOVER, PRUSSIA, GERMANY.

APPARATUS FOR FORCING BEER.

SPECIFICATION forming part of Letters Patent No. 357,031, dated February 1, 1887.

Application filed May 27, 1885. Serial No. 166,887. (No model.) Patented in France October 20, 1880, No. 139,257; in England October 20, 1880, No. 4,274; in Germany October 21, 1880, No. 16,826; in Italy October 30, 1880, XXIV, 375, and in Austria-Hungary December 14, 1880, No. 34,369 and No. 38,364.

*To all whom it may concern:*

Be it known that I, WILHELM RAYDT, doctor of philosophy, a subject of the King of Prussia, residing at Hanover, Prussia, German Empire, have invented certain new and useful Improvements in Apparatus for Forcing Beer, (for which Letters Patent have been obtained in Germany, No. 16,826, dated October 21, 1880; in France, No. 139,257, dated October 20, 1880; in Great Britain, No. 4,274, dated October 20, 1880; in Italy, No. 375, dated October 20, 1880, and in Austria-Hungary, No. 34,369 and No. 38,364, dated December 14, 1880;) and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

This invention relates to an apparatus for forcing beer by means of carbonic acid under pressure obtained from liquid carbonic acid.

In forcing beer from a lower to a higher level it has heretofore been the custom to use compressed air forced into the cask above the level of the beer, and the latter thus forced to the point of distribution, or the tap. This mode, however, has inherent defects, in that all impurities of the air are communicated or transmitted to the beer, and in that the beer under the atmospheric pressure gradually gives up its carbonic acid and absorbs air instead, which causes a loss of its qualities and deteriorates its taste. To avoid these injurious effects of atmospheric air on beer, it has been proposed to substitute carbonic-acid gas, and forcing apparatus have been constructed in which the carbonic-acid gas is produced from carbonate of lime and muriatic acid. The gas so produced is purified by passing it through water before being introduced into the cask under sufficient pressure to force the beer therefrom. Such an apparatus is, however, very complicated, and requires constant attention as well as skillful supervision not only in generating the gas from the chemicals mentioned, but also to regulate the volume of gas generated and its pressure according to the volume of beer drawn. On the other hand, great care has to be exercised to prevent the beer from being tainted by muriatic acid. Already, as far back as 1880, I have sought to remedy these inconveniences and detrimental effects upon beer and the health of the consumer of such by forcing the beer by means of carbonic-acid gas obtained directly from liquefied (consequently absolutely pure) carbonic acid, instead of forcing the same by means of atmospheric air or by means of carbonic-acid gas generated by the reaction of muriatic acid upon lime. To this end the carbonic-acid gas was produced in large quantities, purified, and then liquefied by compression and stored in strong iron flasks, to be then used in the establishments for forcing beer by conversion of the liquefied acid into a gas by expansion, as described in German Letters Patent of October 21, 1880. From its first introduction the latter mode of forcing beer has found great favor not only with the seller, but also with the consumer, and the present invention has for its object improvements in apparatus for forcing beer by means of carbonic-acid gas obtained directly from liquefied carbonic acid; and it consists in the construction, arrangement, and combination of parts, substantially as hereinafter fully described, and as specifically pointed out in the claims.

Referring to the accompanying drawing, which illustrates my improved apparatus by a vertical section, A indicates the carbonic-acid flask, which is preferably a cylindrical wrought-iron vessel of the required strength. To one end or head of the flask A is screwed or otherwise securely attached, so as to be readily removed, a valve-casing, $a$, in which is formed a valve-seat, $a'$, for a valve, $b$, and above the valve-seat the casing is enlarged to form a chamber, $c$. The valve-spindle is screwed in and passes through a suitable stuffing-box, $b^2$, and a cap, $b^3$, screwed onto said stuffing-box, and $p$ $p'$ are suitable packings to form perfectly-tight joints. The valve-casing $a$ has a branch, $e$, to which is connected a pipe, $f$, for conducting the gas from the flask A to the receiver B. This may be done by a direct connection between receiver B and valve-casing $a$; but to afford better control over the apparatus and greater safety, I prefer to connect the pipe $f$ with a valve-casing, $g$, which to this end has a suitable branch, $g'$. The valve-casing $g$ has a second branch, $g^2$, in which is arranged a valve, $h$, the spindle of which carries a hand-wheel, $h'$, and said valve is arranged to close the passage $g^3$ in the valve-casing through which the carbonic-acid gas flows to the receiver B after issuing from pipe $f$. In the upper end of the valve-casing $g$ is screwed a valve-casing, $l$, provided with a seat for a safety-valve, $i$, the spindle of which carries a weight, $k$, that holds said valve to its seat so long as the pressure in the boiler does not exceed a predetermined normal pressure. When, however, the pressure in the receiver exceeds this normal pressure, the valve $i$ is lifted off its seat and the gas in the receiver escapes into a chamber, $m$, formed in casing $l$ above the valve-seat, and thence to the outer air through ports $l'$, formed in the walls of said chamber. The valve-spindle, as shown, passes through a suitable stuffing-box, $l^2$. The receiver B is provided with a manometer, $n$, and said receiver may be directly connected with the cask or casks from which the beer is to be forced by means of flexible or partly-rigid and partly-flexible connections, as is usual when beer is forced by means of compressed air or by means of carbonic-acid gas generated on the spot.

In view of the fact that when a cask is freshly tapped there is generally a great pressure developed within said cask, which is frequently such as to carry the beer into the gas receiver or holder, I prefer to connect the cask or casks indirectly with the receiver, and preferably through the manometer, as shown. The pipe $s$, through which the gas is taken from the receiver or holder B, is connected at one end with the manometer $n$. It is provided with a suitable stop-cock, $r$, and at its other end it is connected with a glass receiver, R, that has at its lower end a stop-cock, $t$. To this receiver R is connected the pipe (or pipes) $q$, that conducts the gas to the cask (or casks) D, and $u$ is the pipe that conducts the beer from the cask to the tap, said pipe extending into the cask to near the bottom thereof.

The connections between the cask and tap and between the cask and receiver R or holder B may be those usually employed in apparatus for forcing beer by means of compressed air, or any other suitable connections, and form no part of this invention. The connections between the flask A and holder B should, however, be such that the former may be readily disconnected from the latter for the substitution of a full flask for one from which the contents have been exhausted. The valve-casing $g$ and the connection between the manometer and holder B may form an integral part of the head thereof; and said holder is provided with a man and peep hole, $p^2$, to inspect its interior and to afford access thereto for the purpose of cleaning the same.

Instead of the valve $h$, a stop-cock may be employed, while the connection between the holder B and flask A may be variously modified without departing from the nature of my invention.

It is obvious that the apparatus may be located at a point distant from the cask or casks from which the beer is forced, and for convenience and ease of superintendence I preferably locate the same in proximity to the tap or taps.

The operation of my improved apparatus is as follows: After connecting a flask, A, full of liquid carbonic acid with the valve-casing $g$ through the valve-casing, $b$, the valve $h$ is opened, and next to the valve $b$, by the application of a key to the squared end of the valve-spindle $b'$ and the rotation of the spindle in the proper direction. The liquid carbonic acid is now by expansion rapidly converted into gas, that is allowed to flow into the holder B until the manometer indicates the required pressure therein, which in practice I prefer to be from 1.5 to 2 atmospheres in excess of the pressure required to force the beer. As the receiver B, before the admission of carbonic-acid gas, is full of air, I prefer to allow the gas to flow into the receiver and drive the air out through pipes $s$, receiver R, and pipe $q$, and then close stop-cock $r$ and connect pipe $q$ with the cask. When the desired pressure has been attained, the valve $b$ is closed and the stop-cock $r$ is opened, and the gas from holder B now flows through the manometer $n$, pipe $s$, receiver R, and pipe or pipes $q$ to the cask or casks from which beer may be drawn. The pressure required in holder B depends upon the height to which the beer is to be forced, on the one hand, and the number of casks connected therewith from which beer is drawn, as will be readily understood. When the pressure in receiver B falls to such an extent that the beer does not flow from the tap as required, the stop-cock $r$ is closed and the valve $b$ opened until the pressure in holder B has again reached its normal degree, as indicated by the manometer, when valve $b$ is closed and stop-cock $r$ opened, and so on.

Inasmuch as a liter of fluid carbonic acid will by expansion form about four hundred and fifty liters of gas, a flask containing nine liters of fluid, will therefore produce about four thousand liters of carbonic-acid gas of ordinary pressure, by means of which about two thousand to three thousand liters of beer can be forced from casks. The substitution of a filled flask, A, for an empty one does, therefore, not take place frequently, though this substitution may, as shown and above described, be effected very readily and with great ease by simply disconnecting the pipe $f$ therefrom, which may be of rigid or flexible material, as desired.

In its function, as well as in its construction, the apparatus is very simple and readily managed, all pumping and other like mechanical means for lifting the beer being dispensed with.

The advantages in forcing beer by means of carbonic-acid gas derived from fluid carbonic acid, besides those already enumerated, are manifold. The beer, no matter how long it may remain on draft, retains its flavor and does not become flat, and when poor in carbonic acid this is supplied thereto, and the beer acquires a better taste and quality, so that the last glasses drawn off are the best, instead of being the worst, as is the case when forced by means of compressed air. In view of the uniform volume of carbonic-acid gas contained in the beer, it gains in clearness, while in the conversion of the acid into a gas and its admixture with the beer heat is absorbed, the beer being consequently cooled, and a saving in ice for cooling the beer effected. Finally, the action of the carbonic-acid gas on the beer prevents sour fermentation of the latter.

In an application for patent for improvements in an apparatus for charging liquids with carbonic-acid gas, filed on or about June 15, 1885, Serial No. 168,774, I have shown devices which, in their general features, are substantially like the devices described and shown in this application; and I do not desire to claim herein any of the constructive features claimed in said application.

I claim as new—

1. The herein-described apparatus for forcing beer, consisting of the flask A, containing liquid carbonic acid, an expansion-chamber in which the gas evolved from the liquid carbonic acid expands and is stored, a vessel containing the liquid to be forced, and valved connecting-pipes between the flask and vessel and the expanding-chamber, substantially as and for the purpose specified.

2. The herein-described apparatus for forcing beer, consisting of a flask, A, containing liquid carbonic acid, an expansion-chamber in which the gas evolved from the liquid carbonic acid expands and is stored, a vessel containing the liquid to be forced, and valved connections between said flask and vessel and the expanding-chamber, in combination with a safety-valve interposed in the connection of the expanding-chamber and flask between the latter and the cut-off valve, substantially as and for the purpose specified.

3. The combination, with the flask A, provided with a valve-casing and a valve, $b$, the holder B, provided with a valve-casing and a valve, $h$, and a pipe for connecting the valve-casing of the holder with that of the flask, the passage of the valve-casing of the holder being in communication with the outer atmosphere, of a safety-valve seated in said passage and closing said communication with the outer air, as and for the purpose specified.

4. The herein-described apparatus for forcing beer, consisting of the flask A, containing liquid carbonic-acid gas, an expansion-chamber in which the gas evolved from the liquid carbonic acid expands and is stored, a vessel containing the liquid to be forced, and valved connecting-pipes between the flask and vessel and the expanding-chamber, in combination with a safety-valve interposed in the connection of the expanding-chamber and flask between the latter and the cut-off valve, and a receiver, R, interposed in the connection between the said expanding-chamber and the vessel containing the liquid to be forced, substantially as and for the purpose specified.

In testimony whereof I affix my signature in presence of two witnesses.

WILHELM RAYDT.

Witnesses:
WILLIAM C. FOX,
JOHS. KRACKE.